No. 822,840. PATENTED JUNE 5, 1906.
H. A. HIGBEE.
GRINDING MILL.
APPLICATION FILED JULY 13, 1903. RENEWED FEB. 12, 1906.

4 SHEETS—SHEET 1.

Witnesses
R. A. Boswell
George M. Anderson

Inventor
Harriet A. Higbee
By E. W. Anderson
her Attorney

No. 822,840. PATENTED JUNE 5, 1906.
H. A. HIGBEE.
GRINDING MILL.
APPLICATION FILED JULY 13, 1903. RENEWED FEB. 12, 1906.

4 SHEETS—SHEET 2.

Witnesses
R. A. Boswell.
George M. Anderson.

Inventor
Harriet A. Higbee
By E. W. Anderson
her Attorney

No. 822,840. PATENTED JUNE 5, 1906.
H. A. HIGBEE.
GRINDING MILL.
APPLICATION FILED JULY 13, 1903. RENEWED FEB. 12, 1905.

4 SHEETS—SHEET 4

Witnesses
R. A. Boswell
George M. Anderson

Inventor
Harriet A. Higbee
By E. W. Anderson
her Attorney

UNITED STATES PATENT OFFICE.

HARRIET A. HIGBEE, OF WORCESTER, MASSACHUSETTS, ASSIGNOR TO HENRY D. PERKY, OF GLENCOE, MARYLAND.

GRINDING-MILL.

No. 822,840.  Specification of Letters Patent.  Patented June 5, 1906.

Application filed July 13, 1903. Renewed February 12, 1906. Serial No. 300,671

*To all whom it may concern:*

Be it known that I, HARRIET A. HIGBEE, a citizen of the United States, and a resident of Worcester, in the county of Worcester and State of Massachusetts, have made a certain new and useful Invention in Grinding-Mills; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
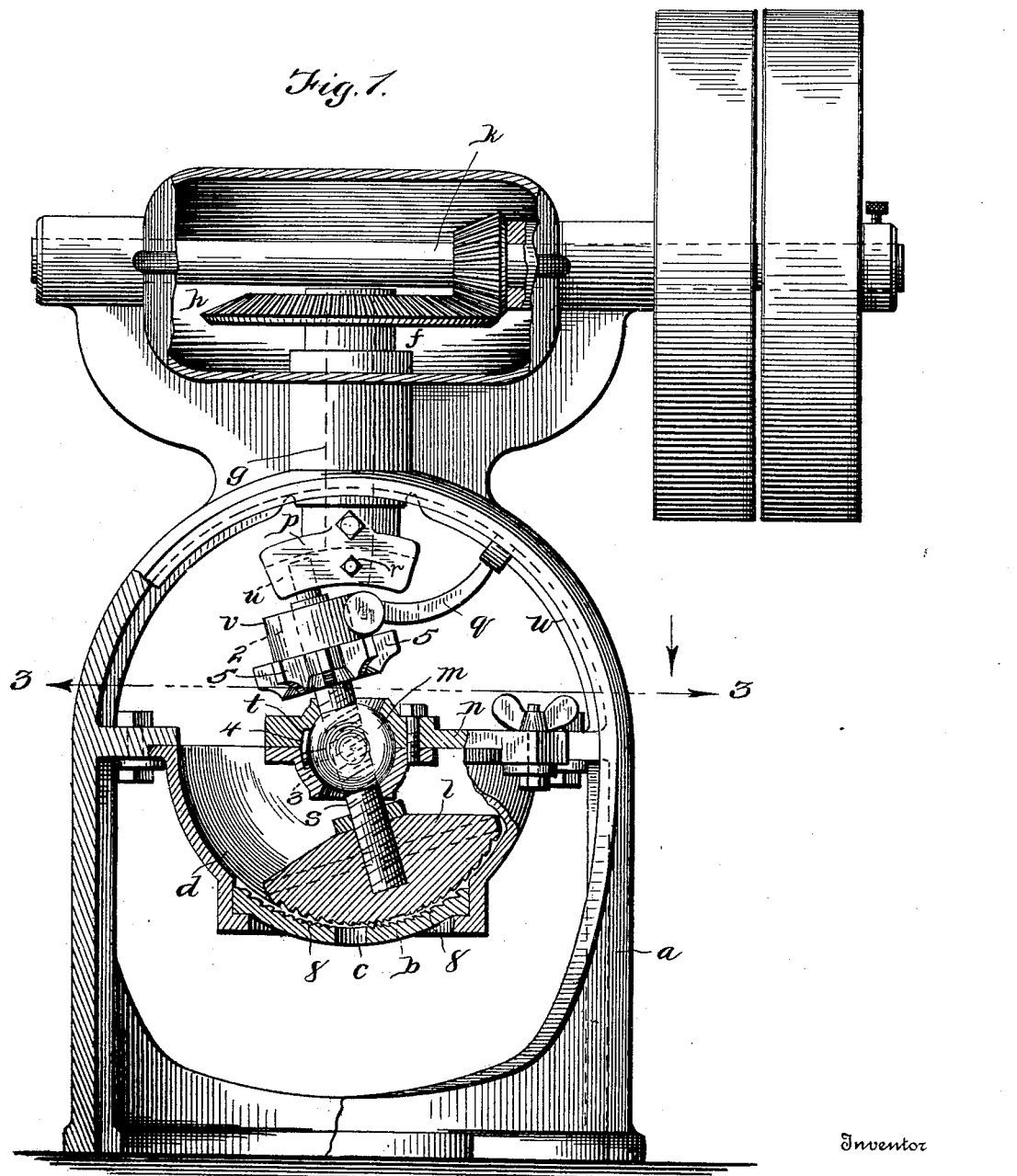
Figure 2:
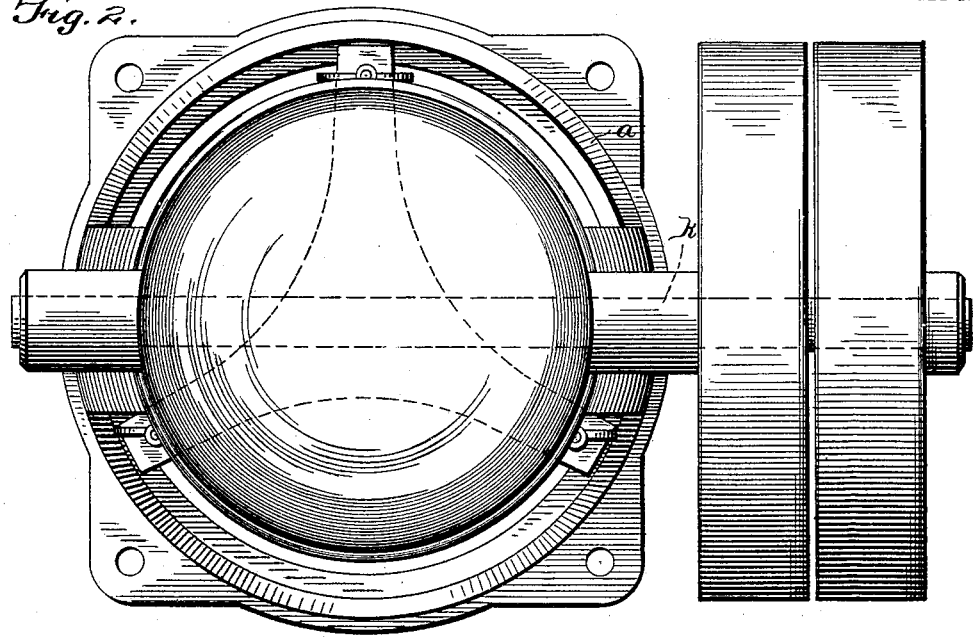
Figure 3:
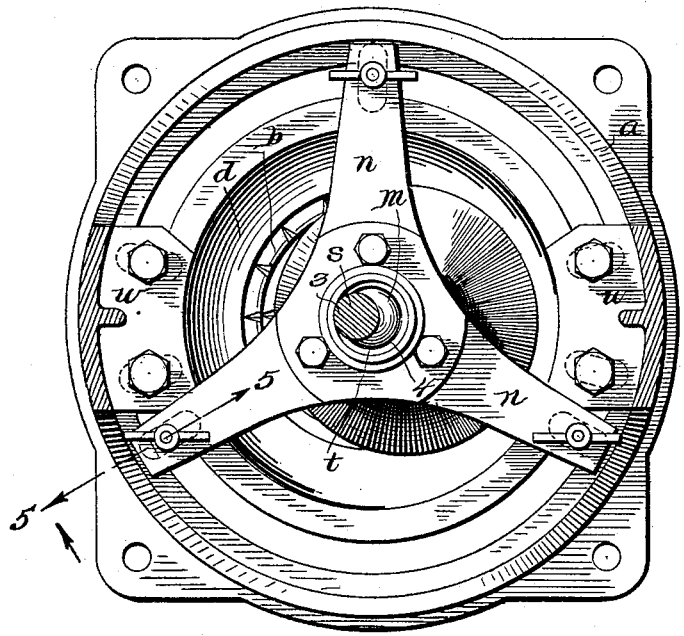
Figure 4:
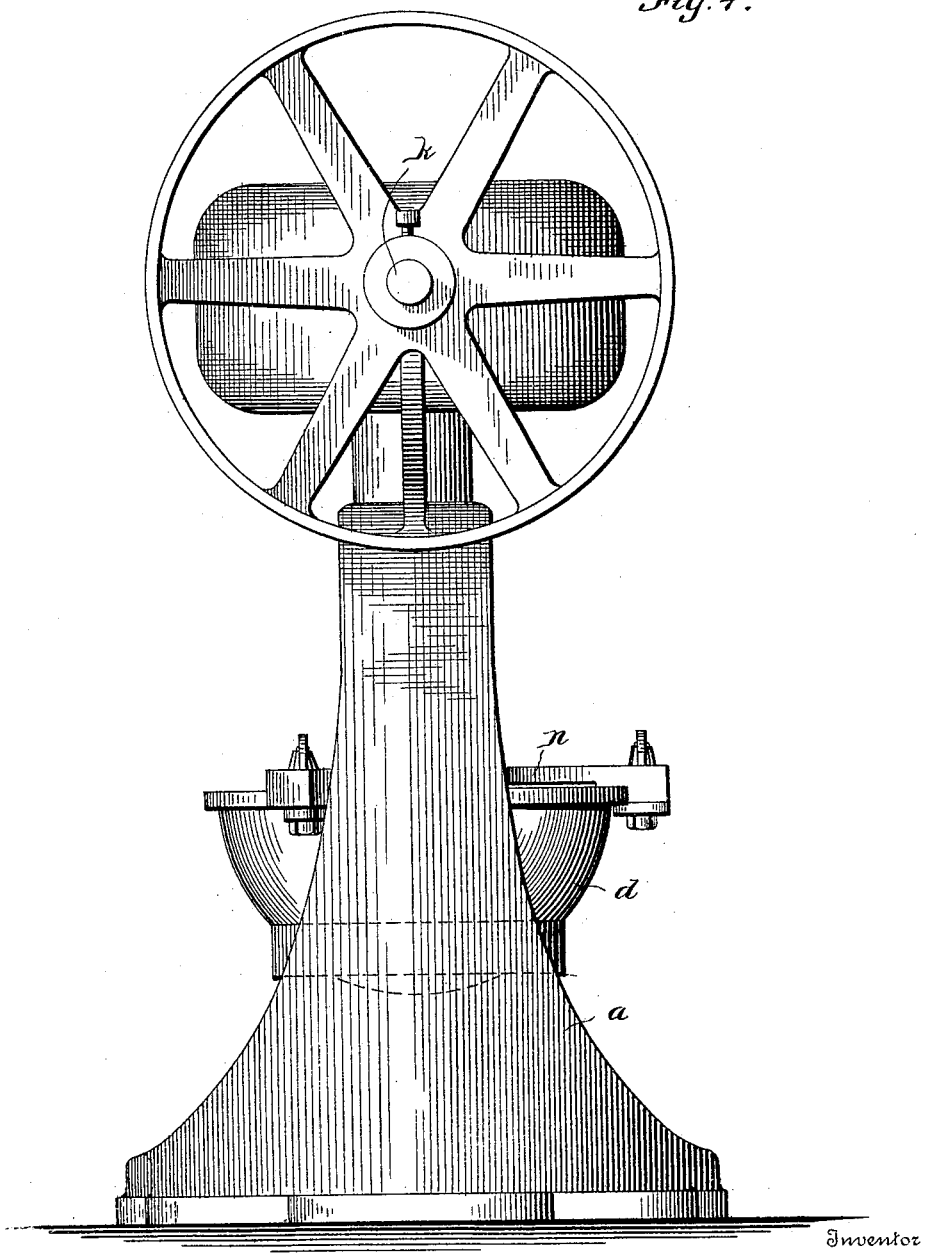
Figure 5:
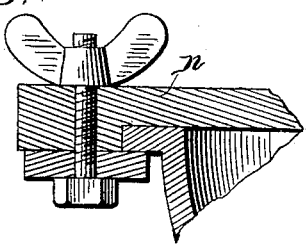
Figure 6:
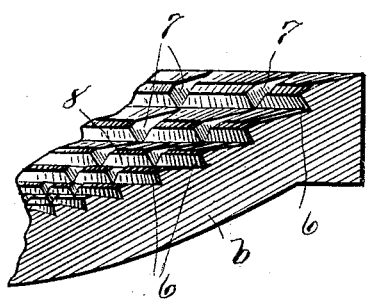
Figure 7:
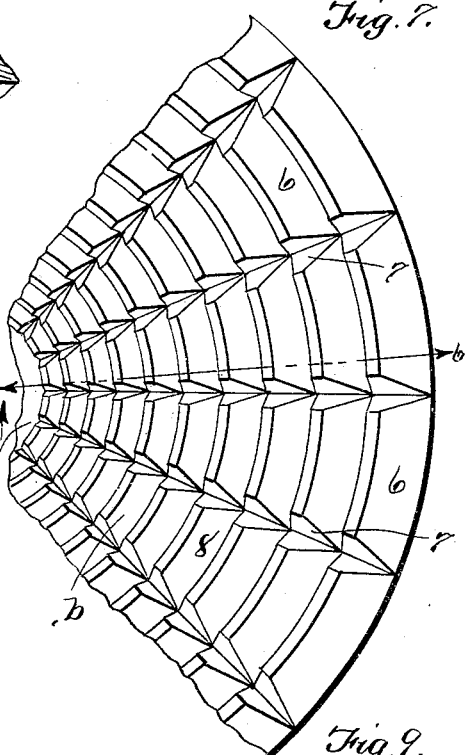
Figure 8:
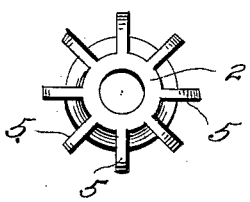
Figure 9:
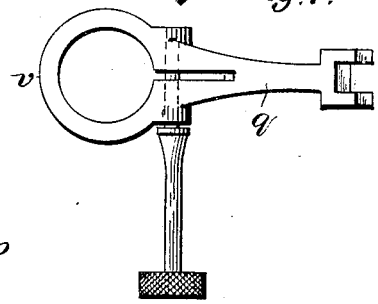
Figure 11:
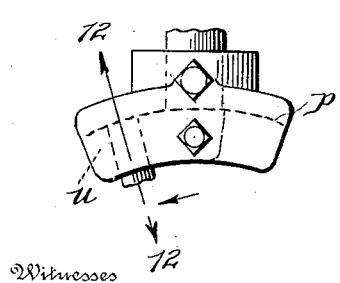
Figure 10:
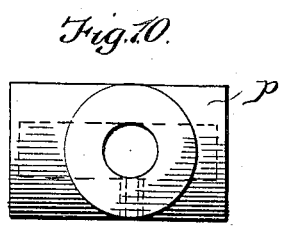
Figure 12:
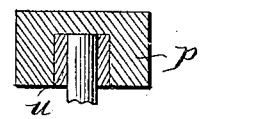
Figure 13:

Figure 1 of the drawings is a vertical sectional view. Fig. 2 is a top plan view. Fig. 3 is a horizontal sectional view. Fig. 4 is a side view, and Fig. 5 is a sectional view, showing the manner of fastening the basin or receiver in the framing. Fig. 6 is an enlarged sectional view of a portion of the lower or fixed grinding-plate. Fig. 7 is an enlarged plan view of the same. Fig. 8 is a plan view of the adjustment-collar. Fig. 9 is a plan view of the guide-arm. Fig. 10 is a top view of the slotted crank-foot $p$. Fig. 11 is a side view of the same attached to the rotary shaft. Fig. 12 is a sectional view showing the crank-foot $p$, the adjustable link therein, and the head of the oscillating shaft or stem of the upper grinding-plate in a bearing of said link. Fig. 13 is a perspective view of the adjustable link.

The invention relates to grinding-mills; and it consists in the novel construction and combinations of parts, as hereinafter set forth.

The object of the invention is to provide a machine which will give each grain a series of circular or circularly-curved movements during the comminution, while gradually increasing the pressure between the grinding-surfaces from the feed to the discharge.

In the accompanying drawings, illustrating the invention, the letter $a$ designates the frame, the parts of which are designed to be detachable, so that the machine may be readily taken apart for such repair as may be needed from time to time. The frame supports a removable lower grinding-plate $b$, of concave-spherical curvature, having a discharge-aperture $c$ through its center. This grinding-plate is set in a removable basin-like portion or receiver $d$, into which the grain to be ground is fed.

The upper part of the frame is provided with a bearing $f$ for the vertical shaft $g$, which is turned through the action of gearing $h$, operating in connection with a shaft $k$, which may be provided with a hand-crank or with power-pulleys.

The upper grinding-plate is indicated at 1, and it is provided with a threaded stem $s$, which is inclined to the vertical and engages in an adjustable manner a ball-nut $m$, operating in a socket-bearing $t$, supported by a cross-bar or spider $n$ of the framing. The stem and grinding-plate 1 are therefore capable of circular motion, and to this end the upper extremity of the stem $s$ plays in a bearing in an adjustable link $u$, seated in a slotted or channeled crank-foot $p$, which is secured to the lower end of the shaft $g$. The stem $s$ is provided with a clamp-ring $v$ on its adjustment-collar 2, this clamp-ring carrying an arm $q$, which engages in a sufficiently-loose manner to allow for the play of the arm a quadrant-guide $w$ of the frame. By means of the adjustable link and its controlling set-screw $r$ in the slotted crank-foot is determined the angular position of the revolving stem with reference to the axial line of the vertical shaft $g$, and thereby the radius of circular motion of the upper grinding-plate. Now the upper grinding-plate, being in the machine shown of convex contour, is dressed upon a spherical radial distance a little shorter than that of the dressing of the lower or concave grinding-plate, so that the distance between the dressed faces of the upper and lower plates is greater at the peripheral or inlet portion than it is at the more central portion or discharge. In this manner it is designed that the pressure upon the grain shall become greater as it is carried by the dress in the circular movements of the upper grinding-plate to the discharge.

The adjustment of the upper grinding-plate is readily accomplished by means of the link and crank-foot, and the adjustment-collar 2, which is secured to the stem $s$, the ball-nut $m$ being held from turning by its guide-pin 3, which plays in a slot 4 of the socket-bearing $t$. The adjustment-collar 2 is usually provided with lugs 5, peripherally arranged so that by a slight tap on one of them when the clamp-ring is loosened adjustment may be effected to render the action of the grinding-plates more close or more open during the operation of the machine. The clamp-ring and the arm loosely working on the quadrant-guide serve to hold the adjustment. The stem *s* has a slight play in the nut *m* owing to the swaying of the arm *q*, and this play provides for a slight reciprocatory crushing motion of the upper grinding-plate.

The dress of the grinding-plates may be varied in design, that which is shown serving an excellent purpose. This dress is characterized by the gradual approximation of concentric lines of teeth from the peripheral portion toward the center and the gradual diminution of the teeth in the same direction. The preferred dress is provided by means of parallel circular channels 6, having their outer faces at right angles, or nearly so, to the general base and their inner faces inclined in connection with the radial channels 7 of double inclined or V form, resulting in truncated teeth 8, having each three inclined walls, an inner more vertical wall, and a flattened end surface.

The actual movements impressed on the upper grinding-plate or rubber are made up of the orbital due to the axes of the stem *s* describing a conical surface, a slight axial rotation due to the sway of the arm *q*, and slight movements of approach and recession with respect to the concave grinding-surface.

Having described the invention, what I claim, and desire to secure by Letters Patent, is—

1. A grinding-mill, having a concave center-discharge spherical grinding-plate dressed with a series of concentric lines of teeth gradually diminishing in size from the periphery to the center-discharge opening, a convex spherical grinding-plate of similar dress on a slightly-shorter radius, means for revolving said convex plate, substantially without rotation and means for adjusting the distance between the toothed grinding-faces of said convex plate and said concave plate, substantially as specified.

2. The combination with a concave spherically-dressed center-discharge grinding-plate, and a convex spherically-dressed grinding-plate, of the adjusting-stem of the latter, its ball-nut and bearing, the operating-shaft and its crank-foot, the link-bearing, the quadrant guide, the adjustment-collar, and the clamp-ring and arm, substantially as specified.

3. The combination with a concave spherically-dressed grinding-plate, and a convex spherically-dressed grinding-plate, of the adjustable stem of said convex grinding-plate, the ball-nut and its bearing, the operating-shaft and the crank-foot thereof, and means for adjusting the radius of revolution of said stem, substantially as specified.

4. The combination with a concave spherically-dressed grinding-plate, of a convex spherically-dressed grinding-plate, means of revolution of the latter, means for limiting its rotation, means of adjusting the distance between the convex and concave grinding-plates, and means of adjusting the radius of revolution, substantially as specified.

5. In a grinding-mill, the combination with a lower circular receiving grinding-plate, and an upper circular grinding-plate, of means for producing motion of revolution of the latter, means for adjusting the radius of revolution, and means for effecting slight movements of approach and recession of the upper grinding-plate with reference to the lower grinding-plate, substantially as specified.

In testimony whereof I affix my signature in presence of two witnesses.

HARRIET A. HIGBEE.

Witnesses:
   JENNIE WHITNEY,
   M. A. CAREY.